United States Patent Office 3,639,401
Patented Feb. 1, 1972

3,639,401
6-ARYL-2,7-BIS[(TRIALKYLSILYL)AMINO]PYRIDO
[2,3-d]PYRIMIDINE COMPOUNDS
Robert F. Meyer, Ann Arbor, Mich., assignor to Parke,
Davis & Company, Detroit, Mich.
No Drawing. Filed July 28, 1969, Ser. No. 845,530
Int. Cl. C07d 51/46
U.S. Cl. 260—256.4                3 Claims

ABSTRACT OF THE DISCLOSURE 6-phenyl- and 6-(p-methoxyphenyl)-2,7-bis[(trialkylsilyl)amino]pyrido[2,3-d]pyrimidines. These compounds are diuretic agents and produce increased urinary excretion of water and sodium. A particular feature, advantageous for some applications, is that they are highly soluble in non-polar organic solvents. The compounds can be produced by reacting 2,7-diamino-6-phenyl- or 6-(p-methoxyphenyl)pyrido[2,3-d]pyrimidine with a silylating agent, preferably a hexaalkyldisilazane.

SUMMARY AND DETAILED DESCRIPTION

The present invention relates to new organic silicon compounds. More particularly, it relates to new 6-phenyl- and 6-(p-methoxyphenyl)-2,7-bis[(trialkylsilyl)amino]-pyrido[2,3-d]pyrimidine compounds of the formula

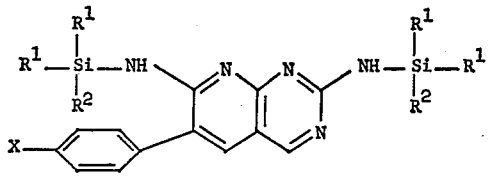

and to methods for their production. In this formula each of $R^1$ and $R^2$ represents methyl or ethyl, and X represents hydrogen or methoxy.

In accordance with the invention, the compounds of the foregoing formula can be produced by reacting a 2,7-diamino-6-arylpyrido[2,3-d]pyrimidine compound of the formula

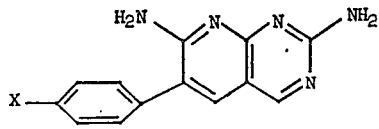

with a silylating agent in an anhydrous, non-hydroxylic solvent; where X is as defined before. Some examples of suitable silylating agents are hexaalkyldisilazanes, N,O-bis(trialkylsilyl)acetamides, N-trialkylsilylacetamides, N-(trialkylsilyl)dialkylamines, and trialkylchlorosilanes in the presence of a tertiary amine such as pyridine. The preferred silylating agents are hexaalkyldisilazanes of the formula

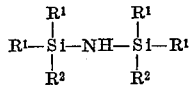

in which $R^1$ and $R^2$ are as defined before. Some examples of such hexaalkyldisilazanes are hexamethyldisilazane, hexaethyldisilazane, 1,3 - diethyl - 1,1,3,3-tetramethyldisilazane, and 1,1,3,3-tetraethyl-1,3-dimethylsilazane. Some examples of suitable anhydrous, non-hydroxylic solvents are hydrocarbons such as benzene, toluene, xylene, and cyclohexane; chlorinated hydrocarbons such as chloroform, carbon tetrachloride, and chlorobenzene; and ethers such as dioxane, tetrahydrofuran, dimethoxyethane, dibutyl ether, and diethylene glycol dimethyl ether. The hexaalkyldisilazanes which are the preferred silylating agents, as indicated above, are used in the presence of an anhydrous acidic catalyst. Some examples of such catalysts are ammonium sulfate, ammonium chloride, ammonium bromide, ammonium dihydrogen phosphate, hydrogen chloride, hydrogen bromide, hydrocarbon sulfonic acids, and cation exchange resins in the hydrogen ion form. In these cases, at least the calculated amount of the hexaalkyldisilazane is employed, and it is often preferred to use a large excess of the hexaalkyldisilazane as an anhydrous, non-hydroxylic solvent in place of or in addition to one of the solvents named above. The time and temperature of the reaction are not particularly critical but they depend somewhat on the particular silylating agent employed. In the case of hexaalkyldisilazanes the usual conditions are 50–200° C. for one to 96 hours, most commonly 100–150° C. for 25 to 50 hours. The product is normally isolated by filtration or by concentration of the mixture and filtration.

2,7-diamino-6-arylpyrido[2,3-d]pyrimidine compounds, employed as starting materials in the practice of the invention, are disclosed in Belgian patent specification 723,-660 and Netherlands patent specification 68/15963.

The compounds of the invention are useful as pharmacological agents and especially as diuretic agents producing increased urinary excretion of water and sodium. The compounds of the invention are active upon either oral or parenteral administration. Their activity as diuretic agents can be measured by standard diuretic assays. For example, a compound of the invention is administered orally (by gavage) with saline to rats that have been subjected to an 18-hour fast from food and water. The urine volume, sodium excretion, and potassium excretion are measured during the 5-hour period following drug administration and compared with corresponding control values in rats that received saline alone without a test compound. In this assay procedure, the following results were obtained for 6-(p-methoxyphenyl)-2,7-bis[(trimethylsilyl)amino]pyrido[2,3-d]pyrimidine, a representative compound of the invention, administered at doses of 2 mg./kg. and 20 mg./kg.:urine volume, 41.5 and 48.3 ml./kg. (control value 9.1 ml./kg.); sodium excretion, 5.95 and 8.01 milliequivalents/kg. (control value 1.38 milliequivalents/kg.); potassium excretion, 0.97 and 0.64 milliequivalent/kg. (control value 0.47 milliequivalent/kg.).

A particular feature of the compounds of the invention is that in addition to their diuretic properties they exhibit high solubility, and in some cases exceptionally high solubility, in non-polar, non-hydroxylic organic solvents. Accordingly, they can be formulated as solutions in pharmaceutically-acceptable non-hydroxylic organic solvents to constitute diuretic compositions for parenteral administration. In aqueous medium or other hydroxylic solvents they are converted by hydrolysis to diuretically-active 2,7-diamino-6-arylpyrido[2,3-d]pyrimidines.

The invention is illustrated by the following examples.

EXAMPLE 1

A mixture of 53.4 g. of 2,7-diamino-6-(p-methoxyphenyl)pyrido[2,3-d]pyrimidine, 0.5 g. of ammonium sulfate, and 300 ml. of hexamethyldisilazane is stirred and heated at reflux for 48 hours. The mixture is cooled to 20° C. and the insoluble product is collected on a filter and dried. It is 6-(p-methoxyphenyl)-2,7-bis[(trimethylsilyl)amino]-pyrido[2,3-d]pyrimidine; M.P. 164–167° C. If desired, this product can be recrystallized from hexane.

Similarly, by substituting 300 ml. of hexaethyldisilazane for the hexamethyldisilazane and stirring and heating the reaction mixture at 120–130° C. for 48 hours, the product obtained is 6 - (p-methoxyphenyl)-2,7-bis[(triethylsilyl) amino]pyrido[2,3-d]pyrimidine.

EXAMPLE 2

A mixture of 71.1 g. of 2,7-diamino-6-phenylpyrido-[2,3-d]pyrimidine, 0.5 g. of ammonium sulfate, and 400 ml. of hexamethyldisilazane is stirred and heated at reflux for 48 hours. The mixture is cooled to 20° C. and the insoluble product is collected on a filter and dried. It is 6 - phenyl-2,7-bis[(trimethylsilyl)amino]pyrido[2,3-d]pyrimidine; M.P. 145–148° C.

Similarly, by substituting 400 ml. of hexaethyldisilazane for the hexamethyldisilazane and stirring and heating the reaction mixture at 120–130° C. for 48 hours, the product obtained is 6 - phenyl-2,7-bis[(triethylsilyl)amino]pyrido-[2,3-d]pyrimidine.

What is claimed is:
1. A compound of the formula

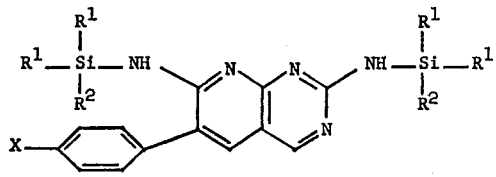

where each of $R^1$ and $R^2$ is a member of the class consisting of methyl and ethyl, and X is a member of the class consisting of hydrogen and methoxy.

2. A compound according to claim 1 which is 6-(p-methoxyphenyl) - 2,7 - bis[(trimethylsilyl)amino]pyrido-[2,3-d]pyrimidine.

3. A compound according to claim 1 which is 6-phenyl - 2,7 - bis[(trimethylsilyl)amino]pyrido[2,3-d]pyrimidine.

References Cited

Theilheimer—"Synthetic Methods of Organic Chemistry," vol. 12, No. 372, pp. 169–70 (1958) Interscience, N.Y.

ALEX MAZEL, Primary Examiner

R. V. RUSH, Assistant Examiner

260—256.4 F; 424—251